Oct. 17, 1939.  A. C. DE BEUCKELAERE  2,176,330
FISHHOOK EXTRACTOR
Original Filed Dec. 30, 1937
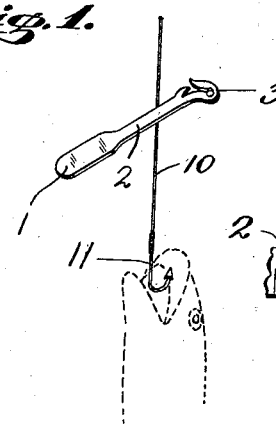
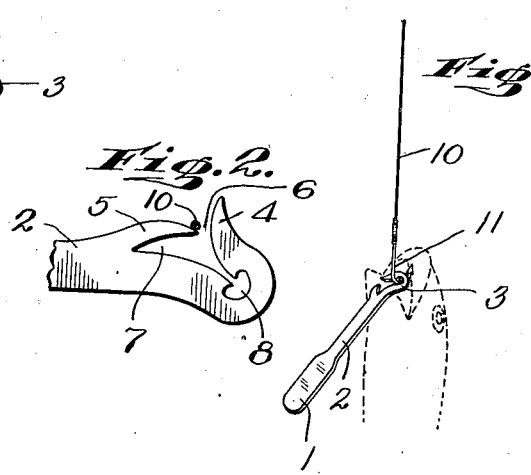
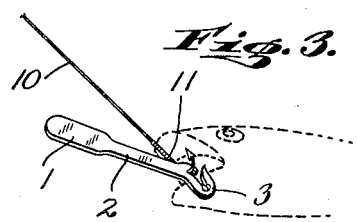
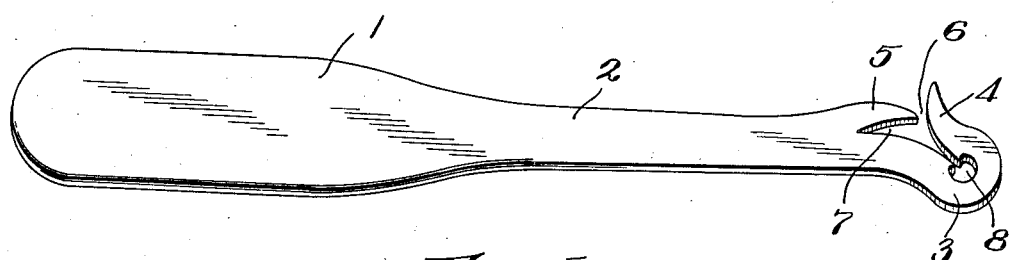
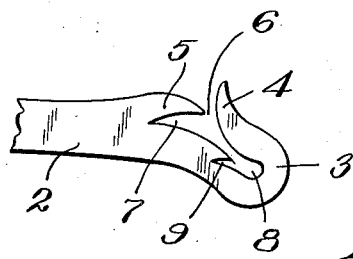
INVENTOR,
Adonis C. De Beuckelaere
BY
Lewis J. Doolittle
ATTORNEY Patented Oct. 17, 1939

2,176,330

UNITED STATES PATENT OFFICE 2,176,330

FISHHOOK EXTRACTOR

Adonis C. De Beuckelaere, Elmhurst, Long Island, N. Y.

Application December 30, 1937, Serial No. 182,429
Renewed August 16, 1939

3 Claims. (Cl. 43—29)

This invention relates to a device adapted for use in extracting a fishhook from the mouth of a fish without the handling of the fish by the fisherman (or fisherwoman) in order to remove the hook after disengaging the same, thus avoiding the danger of injury to the hands of the fisherman when attempting to remove the hook in the usual manner, holding the fish in one hand and grasping the hook with the other, as is done without the assistance of a device such as herein described and shown.

The object of this invention is to provide an effective device for the purpose indicated and which may be easily and cheaply made.

In carrying out the object of my invention, I provide a simple device which is constructed by a punching or stamping operation, to reduce the cost, and is, preferably, constructed or formed as a single piece of flat metal, which is either non-corrosive or plated with a non-corrosive coating. The particular cross-section of the device is not important providing the features of construction are provided to carry out the objects of the device, as will be understood from the description of the embodiment of the invention shown in the accompanying drawing as illustrative thereof.

In the drawing, like parts in the several views have been given the same reference numeral.

Fig. 1 is a general view showing one method of applying the device; Fig. 2 is a side elevation, in full size, showing one end of the device as it is about to be engaged with the line and hook for extracting the latter from the fish; Fig. 3 shows the operative portion of the device engaged with the hook and forcing the same out of its engagement in the mouth of the fish; Fig. 4 shows another method of utilizing the device to disengage the hook; Fig. 5 is a general side view of the device, in full size and Fig. 6 is a fragmentary view of the operative end of the device, showing a modification.

The device is formed in one piece from a flat piece of metal, preferably by stamping the same in a single operation, and is provided with a handle 1 at one end and a narrowed shank portion 2. At the opposite of forward end of the shank portion 2 a hook engaging or operative portion 3 is formed, at one side of which a guiding portion 4 curves outwardly slightly beyond the other portions of the device and a second guiding portion 5 extends longitudinally toward the aforesaid guiding portion 4, with which it co-operates to guide the line or hook-shank through the opening and entrance passage provided, indicated at 6, between the said guiding portions 4 and 5 where it is engaged either in the recess 7 or recess 8, the said entrance passage 6 extending to the recess 8, the recess 7 opening into said passage 6 intermediate the said guiding portion 5 and said recess 8, as will be explained.

In the modification shown in Fig. 6, a third hook disengaging recess 9 is also provided, the operation and purpose of which will be explained hereinafter.

When the fish is caught it is raised to a vertical position, as shown in Fig. 1, and the shank 2 of the device placed against the line 10, then drawn transversely across the line, causing the same to pass over the guiding portion 5, through the opening and entrance passage 6, as shown in Fig. 2, and into the hook-disengaging recess 8, by a longitudinal movement thereof, as shown in Fig. 4. The fish may then be laid flat on the deck of the boat and the device slid along the shank 11 of the hook and engaged with the curved portion thereof, as shown in Fig. 4, and by a quick jerk or pull the hook may be easily disengaged.

Instead of engaging the curved portion of the hook in the recess 8 it may be engaged in the recess 7 and the hook disengaged in a similar manner by pushing the device against the curved portion of the hook, as shown in Fig. 3. The recess 7 is formed with converging sides extending longitudinally and rearwardly from said entrance passage intermediate its outer and inner ends. The choice of the two methods described will depend on the manner in which the hook is engaged in the mouth of the fish, as will be understood by fishermen.

It will be noted that the recess 8 is formed with inwardly extending portions on either side of the entrance thereto. The purpose of the inwardly extending portions at the entrance to the recess 8 is to prevent the accidental displacement of the hook from the recess by the movement of the fish or in the manipulation of the device to disengage the hook.

The methods just described are used when the hook is engaged in the outer portion of the mouth of the fish but it sometimes happens that the hook is swallowed or partially swallowed and engaged deeper in the mouth or in the throat of the fish, in which case the modification shown in Fig. 6 is utilized and the hook engaged in the recess 9, similar to the recess 7 and which is positioned adjacent the recess 8 near the end of the hook-engaging portion of the device, between the recess 7 and 8 and which is then easily pushed down into the throat of the fish sufficiently to disengage the hook, which is then drawn out by the withdrawing of the device from the mouth of the fish, as will be understood.

It will thus be seen that the device provides means for removal of the hook regardless of how it may be engaged in the mouth of the fish and also in the event that the hook may be partially swallowed and engaged in the throat of the fish, thus providing a device which is universal in its character and adapted to accomplish its purpose under any of the various conditions which may be met with in fishing.

What I claim as new and desire to secure by Letters Patent is:

1. A fishhook extractor comprising a single piece of material having a handle portion, a shank portion, and a hook-engaging portion, the hook-engaging portion being formed with a guiding portion extending outwardly from one side thereof beyond the outer side of the device, a second guiding portion extending longitudinally toward the said first named guiding portion and providing an opening and entrance passage between said portions, a recess in said hook-engaging portion into which said entrance passage leads adapted to receive the hook and by means of which the said hook is disengaged when the device is manipulated.

2. A device of the class described comprising a single piece of flat material formed with a handle at one end, a narrowed shank portion, a hook engaging portion at the opposite end at one side of which a guiding portion curves outwardly beyond the other portions of the device, a second guiding portion extending longitudinally toward the aforesaid guiding portion with an opening and entrance passage therebetween providing an entrance for the line or hook-shank, said hook engaging portion being provided at its forward end with a recess into which said entrance passage leads, said recess being formed with inwardly extending portions on either side of the entrance thereto, said hook engaging portion being also provided with a second recess with converging sides extending longitudinally and rearwardly from said passage intermediate said second guiding portion and first named recess.

3. A device of the class described comprising a single piece of flat material formed with a handle at one end, a narrowed shank portion, a hook engaging portion at the opposite end at one side of which a guiding portion curves outwardly beyond the other portions of the device, a second guiding portion extending longitudinally toward the aforesaid guiding portion with an opening and entrance passage therebetween providing an entrance for the line or hook-shank, said hook engaging portion being provided at its forward end with a recess into which said entrance passage leads, said hook engaging portion being also formed with a plurality of recesses with converging sides extending longitudinally and rearwardly from said entrance passage intermediate said second guiding portion and first named recess, one of said last named recesses being positioned adjacent said first named recess.

ADONIS C. DE BEUCKELAERE.